(12) United States Patent
Warner et al.

(10) Patent No.: US 9,568,150 B2
(45) Date of Patent: Feb. 14, 2017

(54) METHOD OF FABRICATING A PRESSURIZED-GAS STORAGE ASSEMBLY

(71) Applicant: Quantum Fuel Systems LLC, Lake Forest, CA (US)

(72) Inventors: Mark Warner, Foothill Ranch, CA (US); Mark Leavitt, Laguna Hills, CA (US)

(73) Assignee: Quantum Fuel Systems LLC, Lake Forest, CA (US)

( * ) Notice: Subject to any disclaimer, the term of this patent is extended or adjusted under 35 U.S.C. 154(b) by 0 days.

(21) Appl. No.: 14/514,070

(22) Filed: Oct. 14, 2014

(65) Prior Publication Data

US 2015/0040371 A1 Feb. 12, 2015

Related U.S. Application Data

(63) Continuation of application No. 13/926,219, filed on Jun. 25, 2013, now Pat. No. 8,881,932.

(51) Int. Cl.
*B65D 25/14* (2006.01)
*B23P 11/00* (2006.01)
(Continued)

(52) U.S. Cl.
CPC ............ *F17C 1/005* (2013.01); *B23P 19/04* (2013.01); *B65D 25/14* (2013.01); *F17C 2203/0634* (2013.01); *F17C 2205/0305* (2013.01); *F17C 2205/037* (2013.01); *F17C 2209/21* (2013.01); *F17C 2209/22* (2013.01);
(Continued)

(58) Field of Classification Search
CPC .............. B65D 25/14; F17C 2205/0305; F17C 2205/037; F17C 1/005; F17C 2203/0634; F17C 2203/0636; F17C 2203/0646; F17C 2203/0648; F17C 2209/21; F17C 2209/22; Y10T 29/49881; Y10T 29/49904; B23P 19/04
(Continued)

(56) References Cited

U.S. PATENT DOCUMENTS 3,132,761 A 5/1964 Sylvester
3,907,149 A 9/1975 Harmon
(Continued)

FOREIGN PATENT DOCUMENTS

EP 0664418 A1 * 7/1995 ............... F17C 1/16

OTHER PUBLICATIONS

International Search Report dated Oct. 22, 2014, issued in International patent application PCT/US2014/044095.

*Primary Examiner* — Essama Omgba
(74) *Attorney, Agent, or Firm* — Baker & Hostetler LLP (57) ABSTRACT

A pressurized-gas storage assembly has a liner defining a gas storage chamber and an end portion with a planar surface, with an access opening on the planar surface that is in fluid communication with the gas storage chamber. A raised circular ring extends from the planar surface and surrounds the access opening. The assembly also includes a polar boss having a longitudinally extending part that has a top surface with a recessed opening, and a planar bottom surface, with a channel extending through the polar boss to serve as a passageway through the polar boss. A circular groove is provided on the bottom flat surface of the polar boss, with the raised ring received inside the circular groove. An outer shell is provided around the entirety of the liner, with the outer shell having an edge-defining aperture that receives the polar boss.

6 Claims, 6 Drawing Sheets (51) Int. Cl.
*B23P 19/00* (2006.01)
*F17C 1/00* (2006.01)
*B23P 19/04* (2006.01)

(52) U.S. Cl.
CPC ... *F17C 2209/234* (2013.01); *Y10T 29/49826* (2015.01); *Y10T 29/49881* (2015.01); *Y10T 29/49904* (2015.01)

(58) Field of Classification Search
USPC ......... 220/592, 465, 582, 586; 277/622, 641
See application file for complete search history.

(56) References Cited

U.S. PATENT DOCUMENTS

| | | | |
|---|---|---|---|
| 4,164,304 A | 8/1979 | Roberson | |
| 4,589,563 A | 5/1986 | Born | |
| 5,253,778 A | 10/1993 | Sirosh | |
| 5,287,988 A | 2/1994 | Murray | |
| 5,429,845 A | 7/1995 | Newhouse et al. | |
| 5,494,188 A | 2/1996 | Sirosh | |
| 5,518,141 A | 5/1996 | Newhouse et al. | |
| 5,538,680 A | 7/1996 | Enders | |
| 5,819,978 A | 10/1998 | Hlebovy | |
| 5,979,692 A | 11/1999 | West | |
| 6,135,308 A | 10/2000 | Fang | |
| 6,186,356 B1 | 2/2001 | Berkley et al. | |
| 6,227,402 B1 | 5/2001 | Shimojima et al. | |
| 6,230,922 B1 | 5/2001 | Rasche et al. | |
| 6,793,095 B1 | 9/2004 | Dulisse et al. | |
| 7,208,207 B2 * | 4/2007 | Ono | C08L 81/02 220/581 |
| 7,513,483 B1 | 4/2009 | Blume | |
| 7,549,555 B2 | 6/2009 | Suzuki et al. | |
| 7,556,171 B2 | 7/2009 | Ishimaru | |
| 7,648,042 B2 | 1/2010 | Lee | |
| 7,857,159 B2 | 12/2010 | Lindner | |
| 7,861,887 B2 * | 1/2011 | Ota | F17C 1/16 220/581 |
| 8,096,441 B2 | 1/2012 | Sato et al. | |
| 8,186,536 B2 * | 5/2012 | Strack | F17C 1/00 220/586 |
| 8,397,938 B2 | 3/2013 | Strack | |
| 8,448,808 B2 | 5/2013 | Tani et al. | |
| 8,501,077 B2 * | 8/2013 | Strack | B29C 45/14467 264/515 |
| 8,733,581 B1 * | 5/2014 | Olson | F17C 1/06 220/586 |
| 8,881,932 B1 * | 11/2014 | Warner | F17C 1/005 220/581 |
| 8,967,417 B2 * | 3/2015 | Sharp | F17C 1/16 220/203.25 |
| 2002/0150746 A1 * | 10/2002 | Ono | C08L 81/02 428/292.1 |
| 2003/0111473 A1 | 6/2003 | Carter et al. | |
| 2006/0169704 A1 | 8/2006 | Brunnhofer | |
| 2007/0012551 A1 | 1/2007 | Rohwer et al. | |
| 2007/0164561 A1 | 7/2007 | Kwon et al. | |
| 2008/0047963 A1 | 2/2008 | Wilson et al. | |
| 2008/0251520 A1 * | 10/2008 | Ota | F17C 1/16 220/586 |
| 2009/0071965 A1 | 3/2009 | Lida et al. | |
| 2009/0255940 A1 * | 10/2009 | Murate | F17C 1/16 220/592 |
| 2010/0112815 A1 | 5/2010 | O'Dougherty et al. | |
| 2011/0210516 A1 | 9/2011 | Sharp et al. | |
| 2011/0304083 A1 * | 12/2011 | Strack | B29C 45/14467 264/515 |
| 2012/0037641 A1 | 2/2012 | Bruce et al. | |
| 2012/0085727 A1 | 4/2012 | Fratti | |
| 2012/0138616 A1 | 6/2012 | Lindner | |
| 2013/0341235 A1 | 12/2013 | Leavitt | |
| 2014/0061207 A1 * | 3/2014 | Kloft | F15B 1/165 220/586 |
| 2014/0239001 A1 * | 8/2014 | Ulekleiv | F17C 1/06 220/589 |
| 2014/0299610 A1 * | 10/2014 | Ulekleiv | F17C 1/06 220/589 |
| 2014/0312043 A1 * | 10/2014 | Sejima | B29C 45/0025 220/586 |
| 2015/0001229 A1 * | 1/2015 | Helmig | F17C 1/06 220/592 |

* cited by examiner

FIG. 6

METHOD OF FABRICATING A PRESSURIZED-GAS STORAGE ASSEMBLY

CROSS-REFERENCE TO RELATED APPLICATIONS

This application is a continuation patent application which claims priority to U.S. non-provisional Pat. No. 8,881,932, filed on Jun. 25, 2013, the disclosures of which is incorporated by reference in its entirety.

BACKGROUND OF THE INVENTION

1. Field of the Invention

This invention relates to storage tanks having liners, especially storage tanks with plastic liners used for storing compressed gaseous fuels. In particular, the present invention is related to a closure assembly for a pressure vessel, which is also a term used to describe such storage tanks.

2. Description of the Prior Art

Pressure vessels are widely used to store liquids and gases under pressure. One growing application of pressure vessels is their use in the storage of alternative fuels, such as natural gas, hydrogen or propane, for use in vehicles such as automobiles. Natural gas and propane are increasingly viewed as preferable to gasoline for fueling vehicles. Accordingly, approaches have been devised for converting gasoline-fueled vehicles to natural gas-fueled or propane-fueled vehicles by retrofitting them to use natural gas or propane instead of gasoline. Additionally, new vehicles are currently being built which are designed to operate using natural gas or propane as the fuel source.

Vessels used for storing natural gases and propane preferably are equipped with a plastic liner, which serves to keep the stored gas from leaking. For a conventional pressure vessel, the liner is overwrapped with composite fibers and epoxy resin to form an outer shell of the pressure vessel. The plastic liner preferably covers the entire interior surface of the pressure vessel, including the neck portion, which defines an access opening for loading fuel. To prevent leakage of fuel at the access opening, a metallic polar boss is roto-molded or injection molded with the liner, and an adapter is installed into the polar boss to finish sealing the liner, and to allow for other metallic parts to attach to the pressure vessel.

The polar boss assemblies for such conventional pressure vessels are therefore provided with two machined parts (i.e., the adapter and the polar boss) This can be disadvantageous as the seal surface of the liner has tight tolerances, and several steps are required to complete the assembly. In addition, in certain of these conventional pressure vessels, additional parts, such as an O-ring or other sealing means, may also be required, thereby further complicating the construction and sealing abilities.

SUMMARY OF THE DISCLOSURE

It is an object of the present invention is to provide an improved polar boss assembly for use with a composite pressure vessel that has a simplified construction with effective sealing capabilities.

It is another object of the present invention to provide a high strength metallic (steel or aluminium) polar boss to a low strength metallic (steel or aluminum) liner.

To accomplish the objectives set forth above, the present invention provides a pressurized-gas storage assembly having a liner defining a gas storage chamber and having an end portion with a planar surface, with an access opening on the planar surface that is n fluid communication with the gas storage chamber, the liner further including a raised circular ring extending from the planar surface and surrounding the access opening. The assembly also includes a polar boss having a longitudinally extending part that has a top surface with a recessed opening, and a planar bottom surface, with a channel extending through the polar boss and communicating with the recessed opening and terminating at the bottom planar surface to serve as a passageway through the polar boss, the polar boss further including a circular groove provided on the bottom flat surface, the circular groove having side walls with threads provided on the side walls of the groove, with the raised ring received inside the circular groove and threadably engaged to each other. An outer shell is provided around the entirety of the liner, with the outer shell having an edge-defining aperture that receives the polar boss.

The present invention may be equipped in conventional tanks, including those having cylindrical configurations, as well as conformable tanks of the type described below. The assemblies may be installed in various types of vehicles, including, without limitation, automobiles, trucks, sports utility vehicles, military vehicles, and the like. In addition, the present invention may be used for tanks, especially portable tanks, such as scuba tanks and oxygen tanks used by firefighters and the like.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
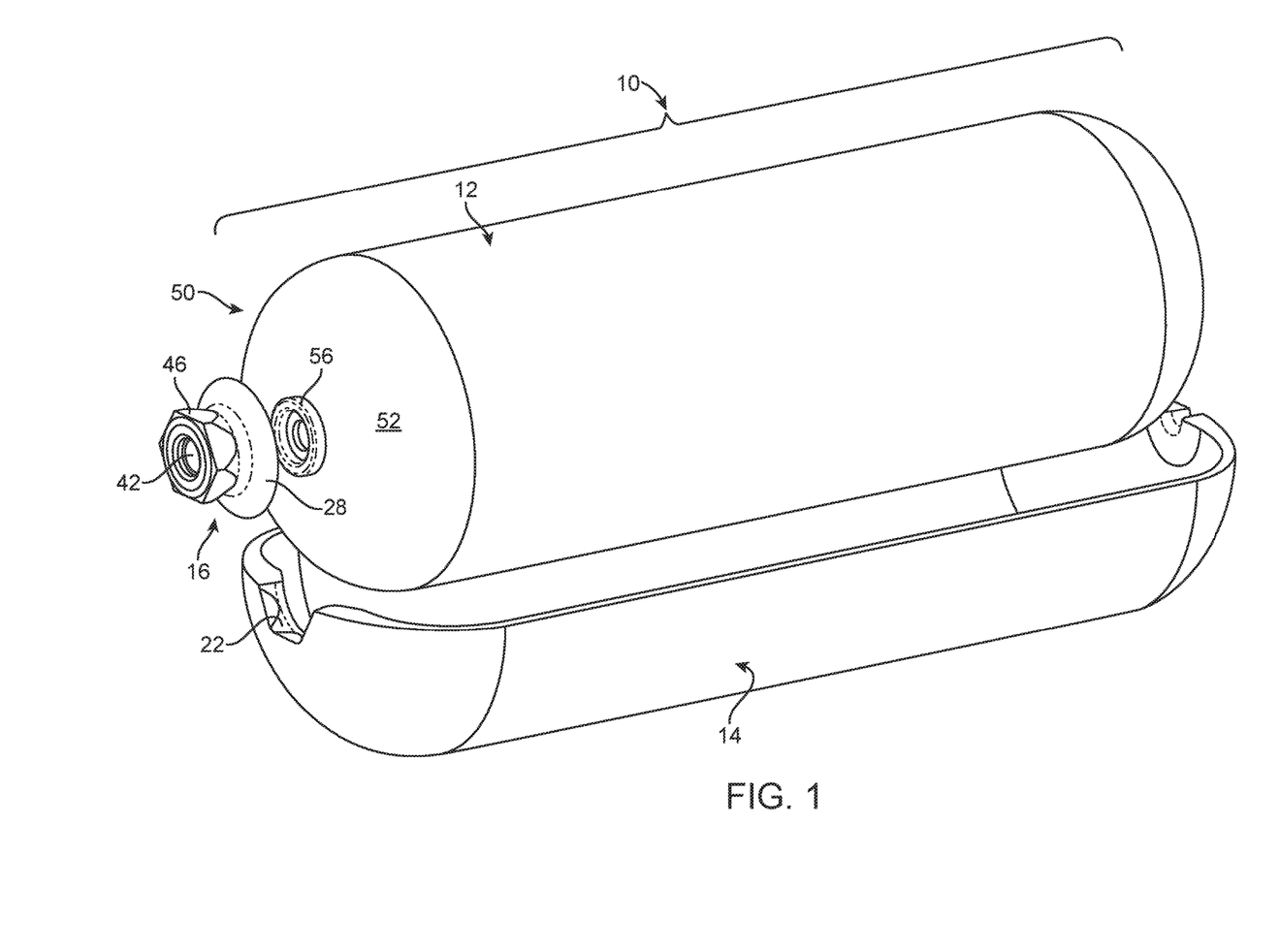
FIG. 1 is an exploded perspective view of a pressure vessel in accordance with an embodiment of the present invention.

FIG. 1 illustrates a pressure vessel 10 according to the present invention. The pressure vessel 10 includes a liner 12 and an outer shell 14 that is formed by wrapping composite fibers and epoxy resin. Even though FIG. 1 shows half of the outer shell 14, it will be appreciated by one skilled in the art that the outer shell 14 extends completely around the liner 12. The construction and assembly of the liner 12 and the outer shell 14 are well-known in the art and shall not be described further herein.

Figure 2:
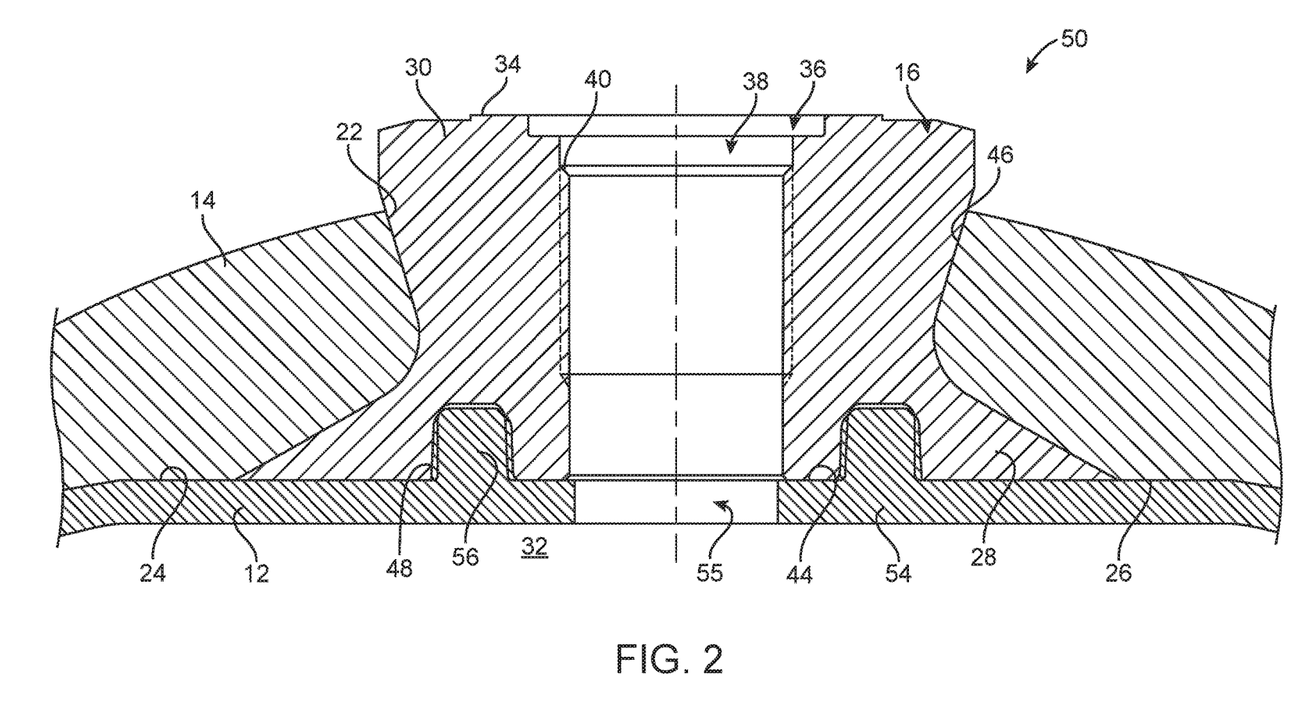
FIG. 2 is a cross-sectional view of the closure assembly of the pressure vessel of FIG. 1.

FIG. 2 is a cut-away view of an end portion 50 of the pressure vessel 10 showing the closure assembly, which includes a polar boss 16. An aperture-defining edge 22 in the pressure vessel 10 defines an access opening for receiving the polar boss 16, and for permitting fluid to be introduced into and removed from the gas storage chamber 32 inside the liner 12. The liner 12 is contiguous with and has a radial outer surface 24 that contacts the inner surface 26 of the outer shell 14 in its entirety, except in the proximity of the access opening, where a radially extending part 28 of the polar Doss 16 is interposed between an interfacing portion of the radial inner surface 26 of the outer shell 14 and the radial outer surface 24 of the liner 12. A longitudinally extending part 30 of the polar boss 16 extends through the access opening and away from the gas storage chamber 32 to define a neck portion of the pressure vessel 10.

As shown in FIG. 2, the longitudinally extending part 30 of the polar boss 16 has a generally flat top surface 34 with a recessed opening 36 that transitions into a first stepped channel 38 that further transitions via a tapered step 40 into a longitudinal channel 42 that serves as a passageway through the body of the polar boss 16. One end of the channel 42 communicates with the opening 36 and the stepped channel 38, and the other end of the channel 42 terminates at the bottom flat surface 44 of the polar boss 16. Therefore, the channels 38, 42, and the opening 36 together serve as a passageway through which the gas can be removed from the gas storage chamber 32.

Figure 3:
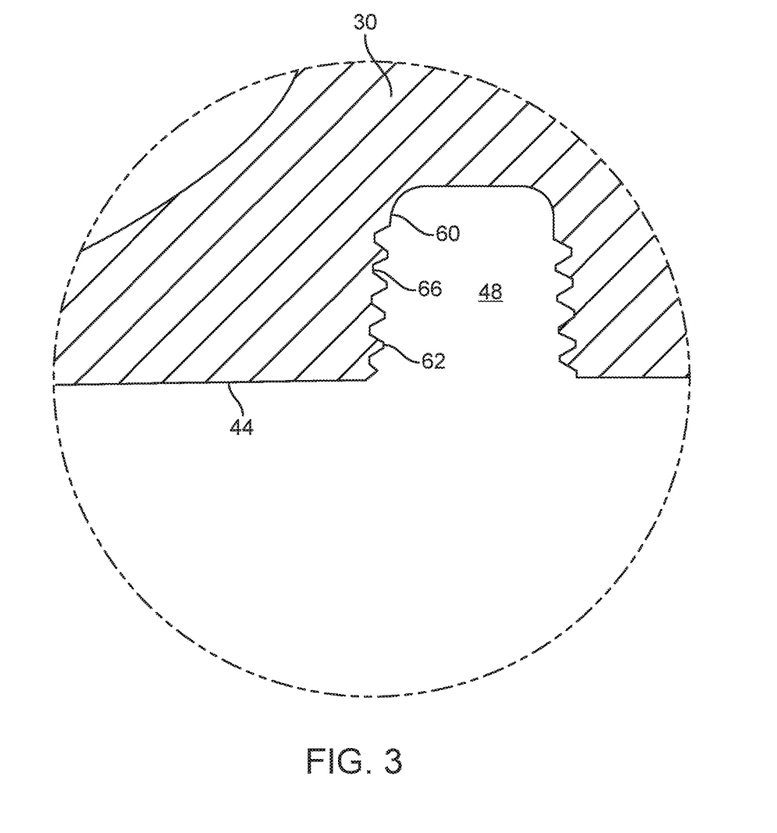
FIG. 3 is an expanded view illustrating the details of the groove of the polar boss.

The generally annular side wall 46 of the longitudinally extending part 30 is sized and configured to allow the polar boss 16 to be tightly fitted inside the aperture-defining edge 22 of the outer shell 14. In a non-limiting example shown in FIG. 2, the side wall 46 extends from the flat top surface 34, curves inwardly and then transitions into the radially extending part 28. A circular groove 48 is provided on the bottom flat surface 44. As best shown in FIG. 3, the inside surface 60 of the side walls of the groove 48 is provided with a male tapered thread 62 that is similar to a male tapered pipe thread and female tapered threads 66. The tapered surfaces can use the standard National Pipe Thread (NPT) taper of 1.79 degrees, or another degree setting depending on the need.

Figure 4:
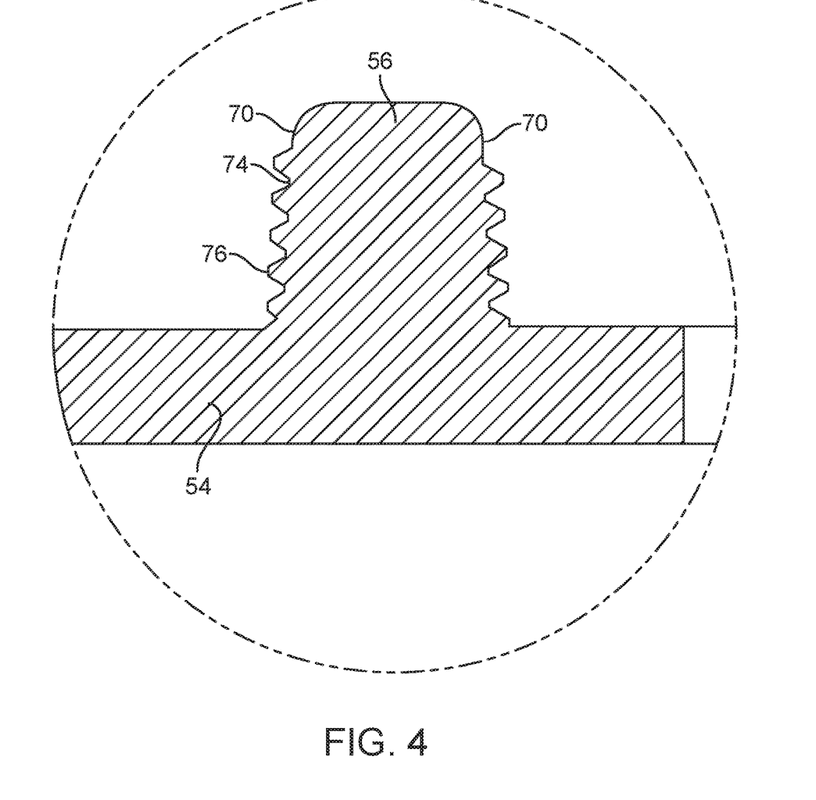
FIG. 4 is an expanded view illustrating the details of the raised ring shown with threads.

Referring to both FIGS. 1 and 2, the liner 12 has a generally convex or curved section 52 at the end portion 50, but there is a generally flat or planar section 54 at about the center of the convex section 52. An access opening 55 is provided at the center of this planar section 54 and adapted to be aligned with the channel 42. Referring also to FIG. 4, a circular raised ring 56 is provided on the planar section 54 at the location where the liner 12 and the polar boss 16 meet, and surrounding the access opening 55. The raised ring 56 has tapered outer sides 70, similar to the inside surface 60 in the groove 48, and are adapted to be threadably engaged therewith. The side walls 70 of the ring 56 can have female and male threads 74 and 76, respectively, to match the threads 62 and 66 of the groove 48. The threads 74 and 76 are tapered, but can also be straight threads. The threads 74 and 76 can be formed by machining or molding.

Figure 5:
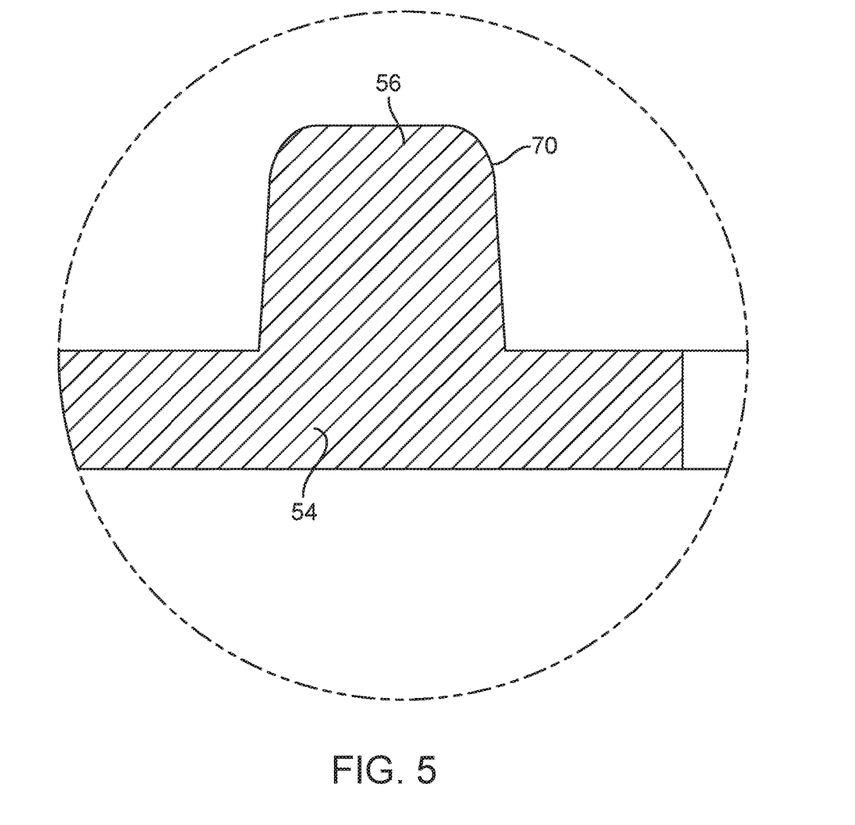
FIG. 5 is an expanded view illustrating the details of the raised ring shown without threads.

Alternatively, as shown in FIG. 5, the side walls 70 of the ring 56 do not need to be threaded as the threads 62, 66 will form or cut threads in the ring 56 as the polar boss 16 is secured to the liner 12.

The tapered threads are used instead of straight threads because the raised ring 56 on the liner 12 will be compressed between the two thread surfaces which will increase the sealing function of the threads.

In this regard, the material of the ring 56 on the liner 12 will be squeezed together as the polar boss 16 is screwed onto the liner 12 as shown in FIG. 1. This squeezing of the liner material and the tapered threads 62, 66 will form a surface to surface seal between the polar boss 16 and the liner 12 at the end portion 52, and will hold the liner material together and not allow the liner 12 to move away from, or relax from, a single tapered thread surface.

After the polar boss 16 has been secured to the liner 12, the outer shell 14 can be formed by filament-winding the filaments according to methods that are well-known in the art. When the outer shell 14 is completed, the outer shell 14 will further secure the polar boss 16 in position at the planar section 54 of the liner 12, as shown in FIG. 2.

Figure 6:
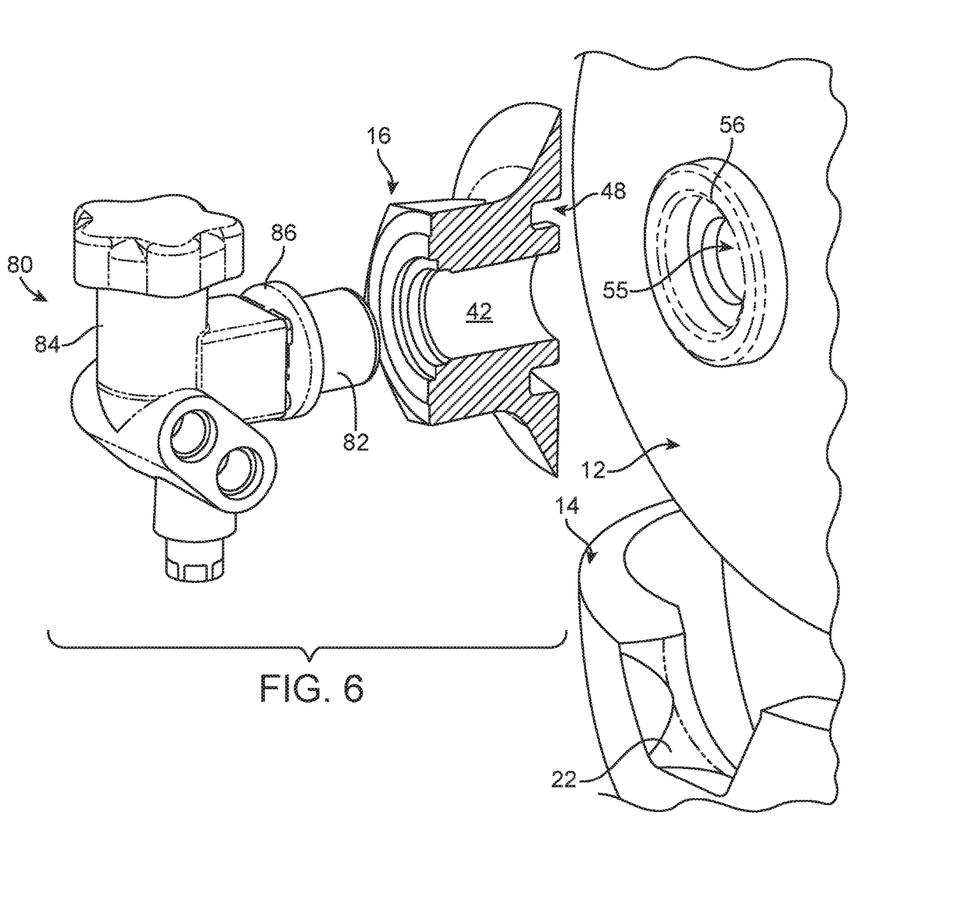
FIG. 6 is an exploded view illustrating how a fitting body is used with the pressure vessel of FIG. 1.

Referring to FIG. 6, a fitting body 80 is received in the channel 42 for hermetically sealing the pressure vessel 10. The fitting body 80 includes head portion 84, and a tubular extension 82 protruding from the head portion 84. An annular shoulder 86 is defined at an end of the head portion 84, with the annular shoulder 86 having an inner circumference defined by the tubular extension 82. As shown in FIG. 6, when the fitting body 80 is received into the channel 42, the tubular extension 82 extends through the channel 42 to protrude towards the gas storage chamber 32, and the annular shoulder 86 faces towards the recessed opening 36. Rotation of the fitting body 80 relative to the polar boss 16 in the appropriate tightening direction mechanically interlocks the fitting body 80 in the polar boss 16.

The outer shell 14 is preferably made of a filament-wound composite material glass, aramid, or carbon fibers reinforced with an epoxy or ester resin system.

The liner 12 may be formed from a thermoplastic or thermosetting material. Suitable materials for forming the plastic liner include, for example, polyamides, such as nylon 6, nylon 11, and nylon 12; polyethylene; polypropylene; polyurethane; and blends and copolymers thereof. The liner 12 may also comprise a metal or metal alloy. The liner 12 can also be formed by blow-molding, roto-molding, other molding techniques known in the art.

Representative materials for making the polar boss 16 include, by way of example, metals, such as aluminum; alloys, such as steel; and/or plastics.

Representative materials for making the O-ring include, by way of example, nitrile-based compounds such as NBR; ethylene propylene copolymers; fluorocarbons; fluorosilicone; neoprene; and silicone.

Representative materials for making the fitting body 80 include, by way of example, metals, such as aluminum; alloys, such as steel; and/or plastics.

The present invention provides numerous benefits when compared with conventional polar boss assemblies. First, instead of using having two machined parts (i.e., the adapter and the polar boss), the present invention omits the adapter and only provides the polar boss. Second, the need for an O-ring is eliminated by the present invention. Third, the present invention allows the polar boss 16 to be assembled to the liner 12 after the liner 12 has been molded or fabricated. Fourth, the machining tolerances of the liner surface are increased at the location of the planar section 54 of the liner 12. Fifth, the present invention can be used to join dissimilar materials such as plastic and metal, different metals, different plastics, etc. Sixth, the present invention can be used on any type of tank liner, including blow-molded liners, roto-molded liners, injection-molded liners and metallic liners. Seventh, the tapered surfaces do not need to be threaded, so a friction weld and/or a bonding agent can be used to join the respective surfaces. Straight threads can also be used with a sealing material, an O-ring, a gasket, a putty, bubble gum, a tree sap, or similar material While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method of fabricating a pressurized-gas storage assembly, the method comprising:
   forming a liner; comprising;
      an end portion with a planar surface, with an access opening on the planar surface that is in fluid communication with the gas storage chamber, the liner further including a raised circular ring extending from the planar surface and surrounding the access opening, the raised circular ring having inner and outer side walls;
   forming a polar boss which defines a longitudinally extending part that has a top surface with a recessed opening, and a planar bottom surface, with a channel extending through the polar boss and communicating with the recessed opening and terminating at the bottom planar surface to serve as a passageway through the polar boss, the polar boss further including a circular groove provided on the planar bottom surface, the circular groove having inner and outer side walls;
   screwing the polar boss onto the end of the liner placing the planar surface of the end portion of the liner against the planar bottom surface of the polar boss, with the raised circular ring received within the circular groove, and the recessed opening aligning with the access opening; and,
   forming an outer shell around the entirely of the liner, the outer shell having an aperture-defining edge that receives the polar boss;
   wherein:
      the circular groove of the polar boss is formed with a first set of helical threads provided on the inner side wall of the circular groove, and a second set of helical threads provided on the outer side wall of the circular groove;
      the liner is formed without helical threads provided on the inner and outer side walls of the raised circular ring; and
      the screwing of the polar boss onto the end of the liner creates a third set of helical threads on the inner side wall and a fourth set of helical threads on the outer side wall.

2. The method of claim 1 wherein the first set of helical threads, the second set of helical threads, or both comprise tapered threading.

3. The method of claim 2 wherein the tapered threading comprises a taper of about 1.79 degrees.

4. A method of fabricating a pressurized-gas storage assembly, the method comprising:
   forming a liner comprising;
      an end portion with a planar surface, with an access opening on the planar surface that is in fluid communication with the gas storage chamber, the liner further including a raised circular ring extending from the planar surface and surrounding the access opening, the raised circular ring having inner and outer side walls;
   forming a polar boss which defines a longitudinally extending part that has a top surface with a recessed opening, and a planar bottom surface, with a channel extending through the polar boss and communicating with the recessed opening and terminating at the bottom planar surface to serve as a passageway through the polar boss, the polar boss further including a circular groove provided on the planar bottom surface, the circular groove having inner and outer side walls;
   screwing the polar boss onto the end of the liner placing the planar surface of the end portion of the liner against the planar bottom surface of the polar boss, with the raised circular ring received within the circular groove, and the recessed opening aligning with the access opening; and,
   forming an outer shell around the entirely of the liner, the outer shell having an aperture-defining edge that receives the polar boss;
   wherein:
      the circular groove of the polar boss is formed with a first set of helical threads provided on the inner side wall of the circular groove, and a second set of helical threads provided on the outer side wall of the circular groove;
      the liner is formed with a third set of helical threads on the inner side wall and a fourth set of helical threads on the outer side wall; and
      the screwing of the polar boss onto the end of the liner engages the first set of helical threads to the third set of helical threads and the second set of helical threads to the fourth set of helical threads.

5. The method of claim 4, wherein the first set of helical threads, the second set of helical threads, or both comprise tapered threading.

6. The method of claim 5, wherein the tapered threading comprises a taper of about 1.79 degrees.

* * * * *